March 19, 1946.  A. F. SPILHAUS  2,396,724
BATHYTHERMOGRAPH AND SEA SAMPLER
Filed April 18, 1941
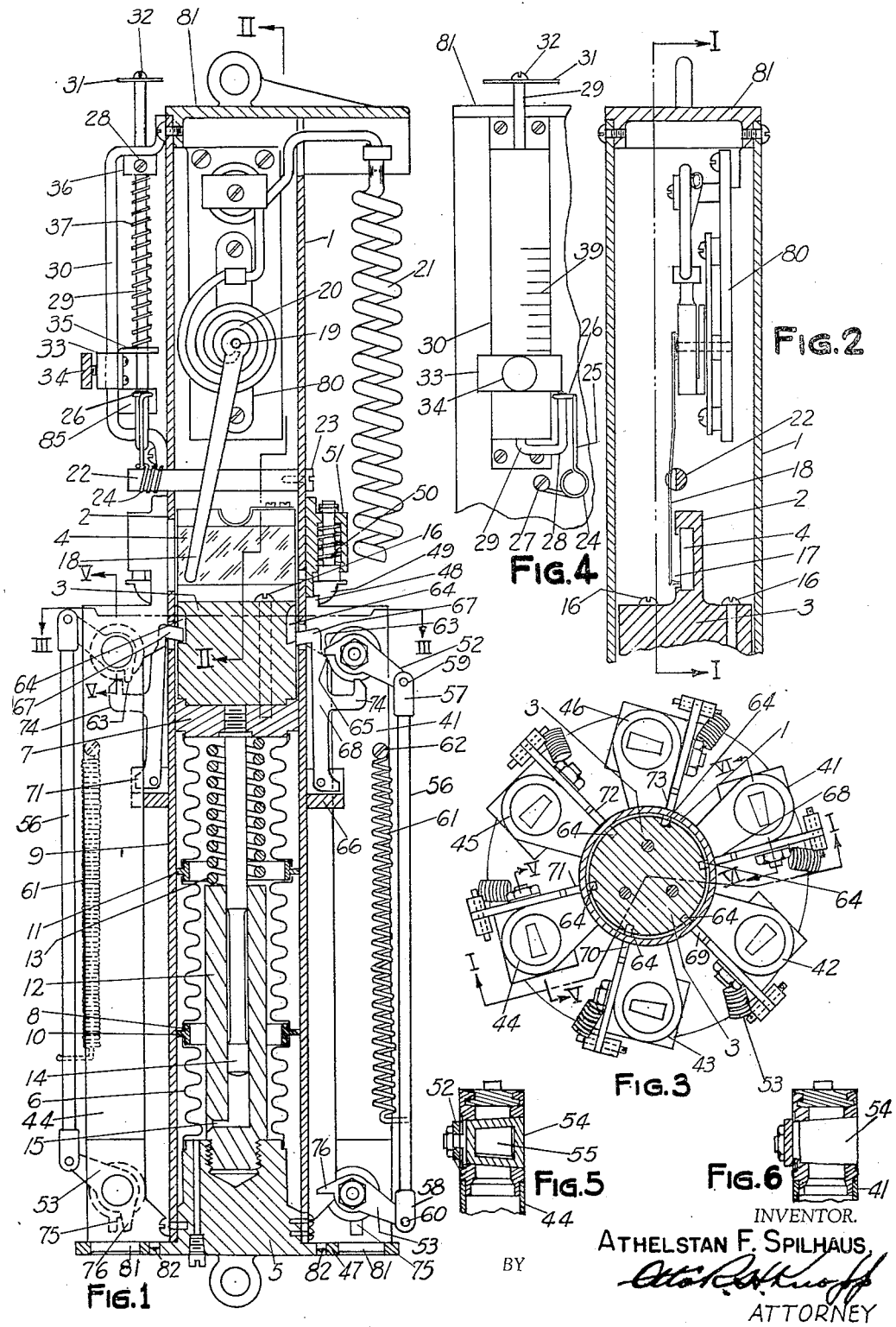
INVENTOR.
ATHELSTAN F. SPILHAUS
BY
ATTORNEY Patented Mar. 19, 1946

2,396,724

UNITED STATES PATENT OFFICE 2,396,724

BATHYTHERMOGRAPH AND SEA SAMPLER

Athelstan F. Spilhaus, University Heights, N. Y., assignor to Submarine Signal Company, Boston, Mass., a corporation of Maine Application April 18, 1941, Serial No. 389,220

11 Claims. (Cl. 73—345)

The present invention relates to improvements in bathythermographs and sea samplers and to a combination bathythermograph and sea sampler.

In my copending application Serial No. 224,074, filed August 10, 1938, Patent No. 2,297,725, granted October 6, 1942, I described a bathythermograph for making a simultaneous record of the temperature of sea water as a function of water pressure or depth of submergence. It is an object of the present invention to provide an improved bathythermograph.

In another copending application Serial No. 389,219 filed April 18, 1941, Patent No. 2,314,372, granted March 23, 1943, I have described a sea sampler, that is, a device for taking samples of sea water from different depths of ocean whereby salinity determinations can be made.

A further object of the present invention is to provide a combination bathythermograph and sea sampler whereby not only can a record of temperature in terms of depth be obtained, but also samples of sea water can be taken at definitely ascertained points on a specific temperature-depth record.

My invention will best be understood from the following description taken in connection with the accompanying drawing in which Fig. 1 shows my device in a partial vertical section taken along the line I—I in Fig. 3; Fig. 2 shows a partial section of the bathythermograph portion of the device taken along the line II—II in Fig. 1; Fig. 3 shows a horizontal section through a part of the sea-sampler portion of the device taken along the line III—III in Fig. 1; Fig. 4 shows an elevation of a portion of Fig. 1 showing the bathythermograph stylus-releasing mechanism; and Figs. 5 and 6 are vertical sections taken along the lines V—V and VI—VI in Fig. 3 and showing the sea-sampler valve mechanism in closed and open positions.

As shown in the drawing, the bathythermograph portion of my device comprises a cylindrical shell or casing 1 containing a plate 4 having a suitable recording surface thereon. The plate 4 may, for example, be in the form of a glass slide coated with a smoked oil film upon which a record can be made under water by means of a stylus. The slide 4 is held in a suitable holder 2 which is mounted upon, or forms part of, a supporting element 3. Apertures are provided in the shell 1 opposite the slide holder 2 so that the record slides can readily be inserted and removed from the instrument. The lower portion of the shell 1 is closed by a solid member 5, at the upper end of which there is mounted a flexible corrugated metallic bellows 6 of cylindrical shape. Such a bellows is stiff and resistant to radial pressure but is readily compressed by axial pressure. The upper end of the bellows is fastened to a member 7 whose diameter is such that it will just slide freely inside the shell 1. The bellows may be made in several sections connected together by rings such as 8 and 9 which preferably are also provided with annular flanges 10 and 11 fitted closely inside the shell 1 to allow free axial motion only. These guiding flanges 10 and 11 help to prevent the metallic bellows from collapsing in any but an axial direction. All the joints between the metallic bellows and the supporting members are hermetically sealed so that no water can get inside the bellows. Within the bellows and fastened to the plug 5 is a hollow cylindrical member 12 extending upwards approximately 2/3 of the length of the bellows. A spiral spring 13 is placed between the member 12 and the member 7 at the upper end of the bellows, the spring being tensioned so as to tend to keep the bellows expanded.

As a further means of preventing any but axial motion of the bellows a piston 14 mounted by its upper end in the member 7 is fitted to slide within the cylinder 12. An air vent 15 is provided at the bottom of the cylinder 12 to permit air to move freely in and out of the cylinder 12. The record-plate supporting member 3 is fastened to the upper end of the bellows by means of screws 16 so that the record plate will move up and down with the member 7 as the bellows is compressed or expanded.

The cylindrical casing 1 is open at various places so as to permit the full water pressure to act upon the elements 3 and 5 to compress the spring 13 in proportion to the water pressure when the device is submerged. Since the pressure in an open body of water increases in direct proportion to the depth, the slide 4 will move downwards when the instrument is immersed in the water by an amount which is directly proportional to the depth of submergence.

A stylus 17, mounted at the end of an arm 18, supported in the upper part of the instrument and bearing against the coated surface of the slide 4, will consequently draw a line in a vertical direction on the slide 4 as the depth of submergence of the instrument is increased.

The stylus 17 is, however, also actuated in a horizontal direction by means of a temperature-responsive element. The stylus-supporting arm 18 is in the form of a lever pivoted at 19 on a supporting bracket 80 secured to a cap 81 closing the upper end of the shell 1. Near the pivot 19 the lever 18 is secured to the inner end of the spiral capillary 20 of a Bourdon tube. The Bourdon tube is carried out through the upper part of the instrument to terminate outside of the instrument in a tube of relatively large surface area such as the helix 21. The Bourdon tube may be filled with mercury or other substance having a relatively high coefficient of expansion. Thus, when the helix 21 is immersed in a medium of warmer temperature, an increase in pressure due to expansion of the liquid within the helix 21 is communicated to the spiral 20 resulting in a tendency for the spiral 20 to unwind, thereby moving the arm 18 and the stylus 17 to the left as shown in Fig. 1. Conversely, when the instrument is immersed in a colder medium, the spiral 20 tends to decrease its diameter and move the stylus 17 to the right.

Thus, as the instrument is lowered into the water, the stylus 17 will inscribe on the record plate 4 a line which is a graph of the variations of water temperature against the depth. As the instrument is withdrawn from the water, the stylus 17 will, of course, also tend to draw a line on the slide and would accurately retrace the line drawn during descent except for the fact that it is not possible to raise the instrument through the same water through which it descended. This is particularly so when the instrument is used from a moving ship as is usually the case. In order to avoid confusion I therefore provide an automatic device for raising the stylus off the surface of the record slide when the instrument is being pulled up out of the water.

This mechanism comprises a cam formed of cylindrical bar 22 extending transversely through the casing 1 and mounted therein in proximity to the stylus lever 18. A portion of the bar 22 within the cylinder and beneath the path of the lever 18 is flattened as shown in Fig. 2. The bar is mounted so that when rotated with the flat portion facing the lever 18, the stylus will be in contact with the slide 4, but when the bar is rotated with the round portion facing the lever 18, the lever will be lifted off the record slide. The member 22 is pivoted in the casing at one end by the screw 23 and extends outside of the casing at the other end. The latter end of the member 22 has fastened to it a spiral spring 24 having an upwardly extending portion 25 terminating in a ring 26 bent at right angles to the portion 25. The other end of the spring is fastened to the shell 1 as by means of the screw 27 as shown in Fig. 4. The spring 24 is tensioned so as to tend to rotate the member 22 in such a manner as to lift the stylus 17 off the record slide 4.

When the instrument is ready to be submerged, the ring 26 is engaged by a hook 28 formed at the end of a rod 29 mounted in a bracket 30 secured to the outside of the casing 1. The rod 29 projects above the bracket 30 and has a flat rectangular plate 31 fastened to its upper end as by the screw 32. A slider 33 is arranged to move up and down on the bracket 30 and may be fixed in position by a thumb screw 34. The slider on the underside of the bracket carries a right-angle projection 35 which has an aperture through which the rod 29 can pass. Between the projection 35 and a block 36, which is secured by screw 38 to the rod 29, a spiral spring 37 is wound around the rod 29. Downward motion of the rod 29 is limited by the rectangular block 85 which is secured to the rod. This spring is tensioned so as to force the rod 29 upwards in which position the hook 28 at the end of the rod can engage the ring 26. When the rod 29 is depressed, the hook 28 is lowered, thereby releasing the ring 26 and permitting the spring 24 to turn the member 22 to lift the stylus off the record slide. The tension of spring 37 is thus readily adjustable both by varying the position of the block 36 on the rod 29 and by varying the position of the slider 33 on the bracket 30.

When the instrument is descending in the water, the motion of the instrument will tend to cause a pressure on the underside of plate 31, thus assisting the spring 37 in holding the rod 29 in its upper position. When, however, the instrument is pulled up through the water, its motion will produce a pressure against the upper side of the plate 31 opposing the force of spring 37, thus tending to depress the rod and release the spring 24 so that the latter by the rotation of member 22 will cause the stylus 17 to be lifted off the slide 4. However, since the instrument is often used from a ship under way, there will be some downward pressure on the rod 29 even while the instrument is descending. The position of slider 33 and consequently the tension of spring 37 must, therefore, be adjusted in accordance with the speed of the towing vessel so that the stylus will not be lifted off the record slide by the pressure on the plate due to the device's motion in the direction it is being towed. For this purpose a scale 39, calibrated in terms of speed of the towing vessel, may be marked on the outside of the bracket 30 to indicate the correct position of the slider 33. When considerable spring tension is used, the stylus-raising mechanism may be tripped by suddenly jerking the towing line.

In order to make it possible to determine the salinity variations of the water simultaneously with the recording of the temperature and depth curve so that there is a definite correlation between the observed temperature, depth and salinity, means are provided whereby a series of samples of the sea water can be taken at various selected depths. From these sea samples the salinity can later be determined by titration in a manner well known to hydrographers.

The sea-sampler portion of the mechanism herein described is, in itself, substantially the same as that shown and described in my copending application Serial No. 389,219, filed April 18, 1941. In the present device the same hydrostatic bellows, as just described for the operation of the bathythermograph, is used for the operation of the sea sampler. A plurality of water sample bottles are used, each being in the form of an elongated metal cylinder having a valve at both upper and lower ends. Six of these bottles may be grouped around the cylindrical shell 1, as indicated in Fig. 3 by the reference numbers 41 to 46. Two of the bottles, namely 44 and 41, appear in elevation in Fig. 1. The bottles are seated on a flange 47 formed as part of the member 5 which closes the lower portion of the shell 1. The flange 47 is provided with holes 81 over which the bottles are positioned by means of pins 82 so that water can freely flow upwards into the bottles. The upper end of each bottle is provided with an ear 48 which is engaged by a catch 49 pressed downwards by a spring 50 within a bracket 51 secured to the outside of the casing 1.

By lifting the catch 47 the corresponding bottle can be tilted upwards and removed from the instrument.

The valves at the top and bottom of the several bottles are simple stopcocks which are opened and closed by the levers 52 and 53. The valves of bottle 44, as shown in Fig. 1, are in closed position while the valves of bottle 41 are in open position. Fig. 5 shows a vertical section through the nearly closed upper valve of the bottle 44, while Fig. 6 shows a vertical section through the upper valve of bottle 41. As shown in these figures each valve comprises a conical plug 54 having a diametral aperture 55 which by rotation of the plug by the lever members 52 and 53 can be turned to open and close the passage into the bottle.

The upper and lower valve-operating levers 52 and 53 of each bottle are joined by a rod 56 having forked ends 57 and 58 into which the ends of the levers 52 and 53 are fitted and secured by pins 59 and 60. A spiral spring 61 is fastened at its upper end by a screw 62 to the wall of the water bottle and at its lower end to the rod 6. The pull of the spring 61 thus tends to raise the rod into the position shown in Fig. 1 for the rod 6 of bottle 44. In this position both upper and lower valves are nearly closed. On bottle 41 the spring is shown in extended position with the valves of the bottle open. The valves are held open by means of a dog 63 formed on the lever 52 and bearing against a shoulder 65 of a link 68 which is pivoted at its lower end on an ear 66 secured to the shell 1. There are a series of these links 68 to 73, one for each bottle. The upper end of the link 68 has a projection 67 which is bent inwards to pass through an aperture in the shell 1. Thus, when the dog 63 presses against the shoulder 65 of the link 68, the link projection 67 will press against the member 3 which is mounted within the shell 1 at the upper end of the hydrostatic bellows. The member 3 is provided with a series of notches 64 all of which are visible in Fig. 3. These notches are of the same length, but the several links 68 to 73 are of different lengths so that as the member 3 is depressed by increased hydrostatic pressure when the instrument descends into the ocean, the projections 67 on the several links will successively be pressed into the grooves 64. When this happens, the dogs 63 are enabled to pass by the shoulders 65 on the links, thereby permitting the springs 61 to complete the closure of the valves of the several water bottles in succession. In order to remove the projections 67 from the grooves 64 so that the member 3 can again move upwards when the instrument is pulled out of the water, the links 68 to 73 are provided with outwardly extending ears 74 which are engaged by the dogs 63 just before the valves are completely closed. This position is shown on the bottle 44 in Fig. 1. The lower end of each bottle is provided with an outwardly extending stop 75 which can be engaged by the dogs 76 on the lower levers 53 to form stops for the closed position of the valves. Thus, the valves on the bottle 44 under the action of spring 61 will be rotated slightly further than shown in Fig. 1 until the dog 76 on the lower valve lever 53 engages the stop 75. This small additional amount of motion is just sufficient to move the ear 74 of the upper link under the urging of dog 63 to pull projection 67 out of the groove 64 in the member 3.

As shown in Fig. 1, the spring 13 of the pressure-responsive member is in slightly compressed position. Under atmospheric pressure the member 3 would be slightly higher within the casing 1 so that none of the projections 67 on the several links could enter any of the grooves 64. Prior to submerging the instrument, therefore, the six dry bottles, all of which are similar, are inserted in the instrument in the positions shown with all the springs tensioned and the valves open as represented by the bottle 41, Fig. 1. Then, when the instrument is submerged, the increasing hydrostatic pressure will gradually depress the member 3, causing the valves in the several bottles to be closed successively at various depths predetermined by the various lengths of the links 68 to 73 in the member 3. In order to change the depths at which the valves are closed, links 68 to 73 of different lengths are substituted. It will be observed that this can be done without disassembling the instrument except for the removal of the water bottles. When the several valves are closed under the action of the springs 61, the instrument is given a slight shock by the impact of the dogs 76 against the stops 75 which causes the stylus 17 to make a slight transverse mark on the slide 4. Since the slide at that instant has been vertically displaced in accordance with the hydrostatic pressure, the marks on the slide will indicate the exact depth at which each of the water samples was taken. It is merely necessary, then, for the operator to identify a given record slide with a given set of water samples in order later to have exact information of the salinity and temperature changes of the water with depth at the position at which the record was made.

The record-bearing slides are conveniently examined by projecting the stylus trace on a precalibrated chart, or if desired permanent enlarged records can be made by photographic projection printing.

Having now described my invention, I claim:

1. A bathythermograph comprising a record plate, means mounting said plate for movement in one direction as a function of hydrostatic pressure, a temperature-responsive element, a stylus operated thereby in a direction substantially at right angles to the motion of said plate and normally positioned to make a trace on said plate in response to relative movement between the plate and the stylus, and means responsive to upward motion of the instrument through the water to raise the stylus off the record plate.

2. A bathythermograph comprising a record plate, means mounting said plate for movement in one direction as a function of hydrostatic pressure, a temperature-responsive element, a stylus operated thereby in a direction substantially at right angles to the motion of said plate and normally positioned to make a trace on said plate in response to relative movement between the plate and the stylus, and means responsive to upward motion of the instrument through the water to raise the stylus off the record plate, said means including a pressure plate positioned so as to be acted upon by water flow around the instrument, a cam adapted upon rotation to raise said stylus off the record plate, spring means tending to rotate said cam into its position with the stylus raised and means operatively connected to said plate for releasing said spring for action on said cam only in response to pressure produced by the flow of water around said plate when the instrument is pulled upwards through the water.

3. A combined bathythermograph and sea sampler comprising an element adapted to be moved in one direction as a function of hydrostatic pressure, a record plate, a stylus, means actuated by said element for relatively moving said stylus and said plate, a temperature-responsive device, means actuated by said device for relatively moving said stylus and said plate in a direction substantially perpendicular to the direction of motion produced by said element, a plurality of water sample bottles, valves for closing each of said bottles and means actuated by said element for closing the valves on each of said bottles at a predetermined depth and impact-producing means associated with said valve-closing means for producing a slight relative motion between said stylus and said plate whereby a mark is made on the record plate at the instant each water bottle is closed.

4. A bathythermograph comprising an elongated casing, a hermetically sealed metallic bellows adapted to be compressed by hydrostatic pressure mounted within said casing and fixed by one end thereto with the compression axis of the bellows parallel to the long axis of the casing, a record plate having a flat record surface mounted on the free end of said bellows in a plane parallel to the compression axis of the bellows, a stylus mounted within said casing and positioned in the plane of said record surface, and a Bourdon tube mounted within the casing and having in communication therewith a temperature-responsive element comprising a tube wound in an elongated helix mounted outside of said casing and adapted to produce pressure variations in response to temperature variation for the actuation of said Bourdon tube and means for transmitting motion of the latter to said stylus to move the same across said record plate in a direction substantially at right angles to said compression axis.

5. A combined bathythermograph and sea sampler comprising an instrument adapted to be lowered into the sea and including means for taking separate samples of sea water at a plurality of different depths, means for recording a continuous curve of temperature and pressure variations of the sea water coincidentally with the taking of said samples and means for indicating the points on said curve at which said samples are taken.

6. A combined bathythermograph and sea sampler comprising an instrument adapted to be lowered into the sea and including means for taking a sample of sea water, means for recording a continuous curve of temperature and pressure variations of the sea water as the instrument is lowered and means for indicating the point on said curve at which said sample is taken.

7. A combined bathythermograph and sea sampler comprising an instrument adapted to be lowered into the sea and including pressure-responsive means, means for taking a water sample, means controlled by said pressure-responsive means for effecting the taking of a sample at predetermined pressure by said means for taking the water sample, temperature-responsive means, recording means, means including in part said pressure-responsive means, in part said temperature-responsive means and in part said sampler-taking means for actuating said recording means for recording the temperature and pressure of the water at the point the sample is taken.

8. A bathythermograph comprising a pressure-responsive element, a record chart adapted to be moved in its plane by said pressure-responsive element, a Bourdon tube having in communication therewith a temperature-responsive tube adapted to produce pressure variations for the actuation of said Bourdon tube, a stylus positioned substantially in the plane of said chart and adapted to mark the same, and means connecting said stylus with said Bourdon tube for moving the stylus in response to motion of said Bourdon tube.

9. A bathythermograph comprising a pressure-responsive element, a record chart adapted to be moved in its plane by said pressure-responsive element, a Bourdon tube having in communication therewith a temperature-responsive helical tube element adapted to produce pressure variations for the actuation of said Bourdon tube in response to temperature variations, a stylus positioned substantially in the plane of said chart and adapted to mark the same and means connecting said stylus with said Bourdon tube for moving the stylus across the chart in response to motion of said Bourdon tube.

10. A bathythermograph comprising an elongated cylinder having a Bourdon tube mounted at one end thereof with a recording stylus-carrying arm operated thereby positioned substantially in the longitudinal axis of said cylinder and adapted to rotate about an axis perpendicular thereto, a temperature-responsive helical tube element in communication with said Bourdon tube for the operation of the latter, a pressure-responsive bellows element positioned longitudinally in said cylinder and supported at one of its ends to the other end of the cylinder, said bellows having at its other, free end a recording plate positioned in the plane of motion of the recording stylus, the expansive and contractive motion of said pressure-responsive bellows being adapted to move said recording plate in an extension of its same plane and the motion of said stylus arm being adapted to move said stylus over the surface of said recording element.

11. A bathythermograph comprising an elongated cylinder having a Bourdon tube mounted within the same at one end thereof, a temperature-responsive helical tube element in communication with said Bourdon tube for the operation of the latter and mounted outside of said cylinder, a pressure-responsive bellows element positioned longitudinally within said cylinder and fixed by one end to the other end of the cylinder, means for mounting a record chart on the free end of said bellows element for longitudinal motion therewith and stylus means positioned in the plane of said chart and adapted to mark the same and means connecting said stylus to said Bourdon tube for moving the stylus across the chart in response to motion of said Bourdon tube.

ATHELSTAN F. SPILHAUS.